United States Patent
Jaramillo

(10) Patent No.: US 9,844,265 B2
(45) Date of Patent: Dec. 19, 2017

(54) ADJUSTABLE TELEVISION NOOK MOUNT

(71) Applicant: EchoStar Technologies L.L.C., Englewood, CO (US)

(72) Inventor: Harold Bernard Jaramillo, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 708 days.

(21) Appl. No.: 14/015,870

(22) Filed: Aug. 30, 2013

(65) Prior Publication Data

US 2015/0060616 A1    Mar. 5, 2015

(51) Int. Cl.
*F16M 11/10*    (2006.01)
*A47B 81/06*    (2006.01)
*F16M 11/22*    (2006.01)
*F16M 13/02*    (2006.01)
*A47B 97/00*    (2006.01)

(52) U.S. Cl.
CPC ............ *A47B 81/061* (2013.01); *F16M 11/22* (2013.01); *F16M 13/02* (2013.01); *A47B 2097/005* (2013.01)

(58) Field of Classification Search
CPC .... F16M 13/02; F16M 11/10; F16M 11/2014; F16M 11/04; Y10S 248/906
USPC .......... 248/201, 298.1, 917, 309.1, 317, 323
See application file for complete search history.

(56) References Cited

U.S. PATENT DOCUMENTS

| | | | |
|---|---|---|---|
| 7,866,622 B2* | 1/2011 | Dittmer | 248/421 |
| 7,918,428 B2* | 4/2011 | Kim et al. | 248/295.11 |
| 8,827,226 B2* | 9/2014 | Townsend et al. | 248/323 |
| 2003/0222191 A1* | 12/2003 | Tsai | 248/354.1 |
| 2011/0174944 A1 | 7/2011 | Fredette | |
| 2012/0025046 A1* | 2/2012 | Yen | 248/298.1 |

OTHER PUBLICATIONS http://carolinacustomsound.com/fireplace-nook-mount/ (3pp) (downloaded on Sep. 18, 2013).

* cited by examiner

*Primary Examiner* — Rodney Mintz
*Assistant Examiner* — Daniel Kenny
(74) *Attorney, Agent, or Firm* — Seed IP Law Group LLP

(57) ABSTRACT

In various embodiments, a television wall mount is provided that may be installed at a position in a television wall nook such that when the television monitor is bolted, screwed or hung on the television monitor mounting bracket, the television is located in front of and outside the television wall nook. In this manner, a television monitor that is too wide to fit in the television wall nook may be installed over the television wall nook by mounting the television on the television wall mount installed in the television wall nook.

15 Claims, 10 Drawing Sheets

ADJUSTABLE TELEVISION NOOK MOUNT

BRIEF SUMMARY

In one embodiment, a television wall mount includes a first mounting plate configured to be attached to a first vertical sidewall of a television wall nook and a second mounting plate configured to be attached to a second vertical sidewall of the television wall nook 105. The television wall mount has crossbeam attached to the first mounting plate at a first end of the television monitor wall crossbeam and to the second mounting plate at a second end of the crossbeam. The crossbeam includes a television monitor mounting bracket configured to have the television monitor mounted thereon. The television monitor mounting bracket is attached to a front side of the television monitor wall mount crossbeam at a location between the first end and the second end of the television monitor wall mount crossbeam.

The television wall mount may be installed at a position in the television wall nook such that when the television monitor is bolted, screwed or hung on the television monitor mounting bracket, the television is located in front of and outside the television wall nook. In this manner, a television monitor that is too wide to fit in the television wall nook may be installed over the television wall nook by mounting the television on the television wall mount installed in the television wall nook.

BRIEF DESCRIPTION OF THE DRAWINGS

Like reference numerals designate corresponding parts throughout the several views.

DETAILED DESCRIPTION

Figure 1:
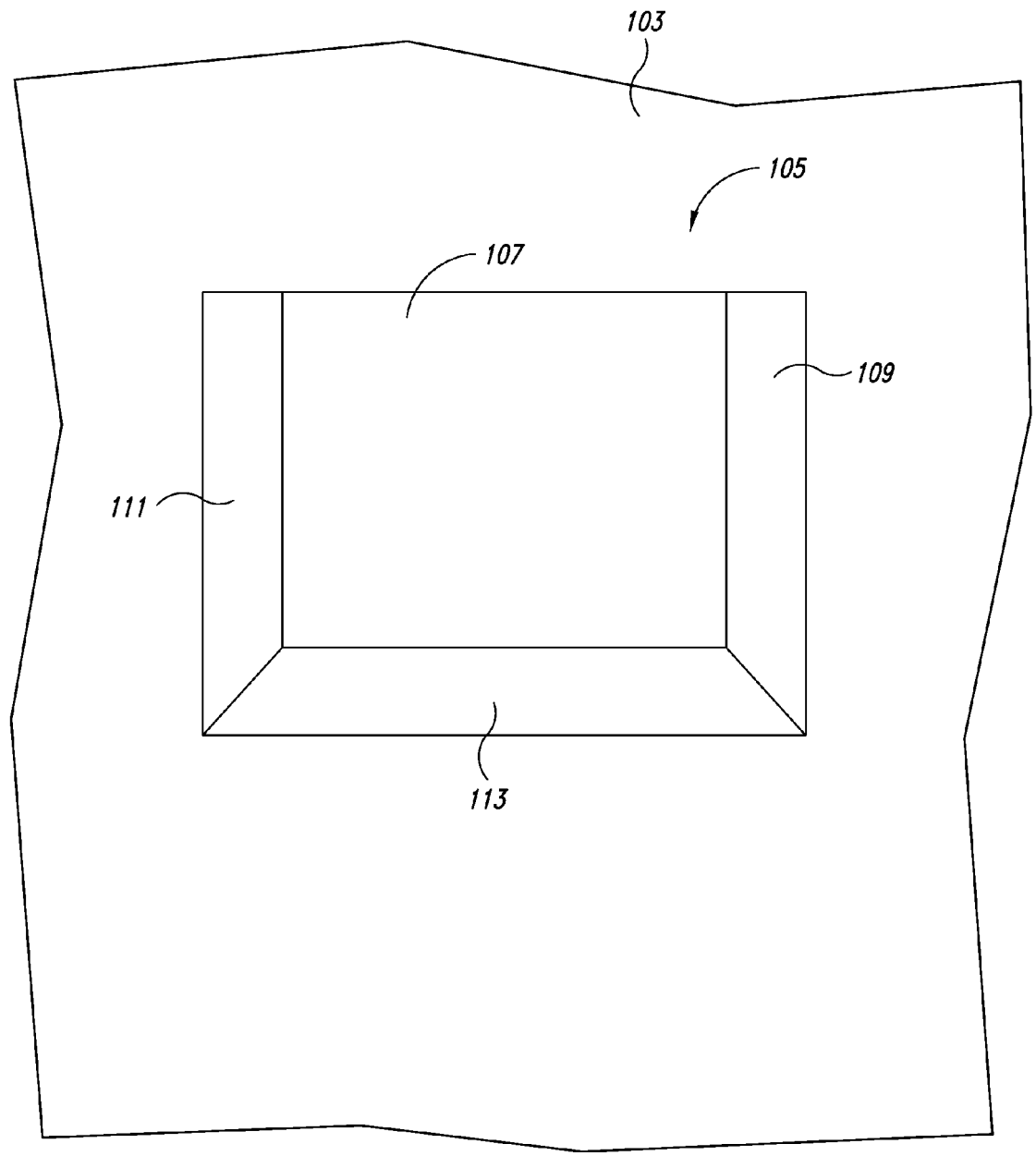
FIG. 1 is a front perspective view of an example television wall nook.

Shown in FIG. 1 is a front perspective view of an example television wall nook 105. Traditionally, a television wall nook 105 is formed in a wall 103 of a building such that a television or an entertainment center may be placed or installed therein. As shown in FIG. 1, the example television wall nook 105 formed in the wall 103 has a bottom surface 113, two vertical side walls 111, a vertical back wall and a top surface (not shown) above the bottom surface 113. However, many television wall nooks are too small, either in width or height, to fit many modern televisions (especially widescreen televisions).

Figure 2A:
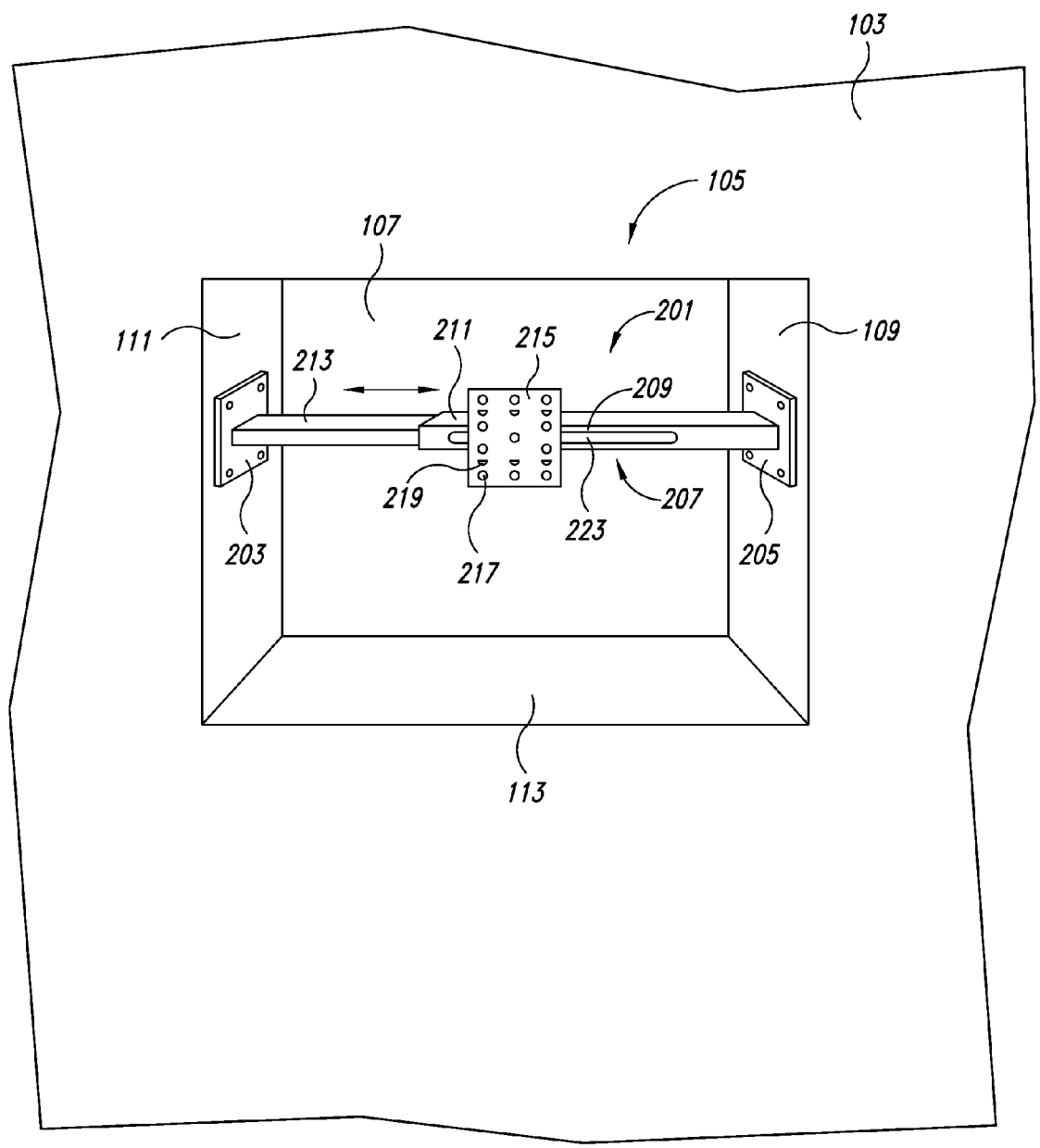
FIG. 2A is a front perspective view of a television wall mount installed in the example television wall nook of FIG. 1, according to one example embodiment.

Shown in FIG. 2A is a front perspective view of a television monitor wall mount (or television wall mount) 201 installed in the example television wall nook 105 of FIG. 1, according to one example embodiment. The television wall mount 201 of FIG. 2A provides a way for television wall nooks to be used for televisions that otherwise would be too large to fit in the television wall nook. In particular, the television wall mount 201 of FIG. 2A is configured to be installed in the television wall nook 105 such that a television monitor that does not fit in the television wall nook 105 will be located outside of the television wall nook 105 when mounted on television monitor mount 201.

Television wall mount 201 includes a first mounting plate 203 configured to be attached to a first planar surface 111 of the television wall nook 105 and a second mounting plate 205 configured to be attached to a second planar surface 109 of the television wall nook 105. The television wall mount 201 has a television monitor wall mount crossbeam 207 attached to the first mounting plate 203 at a first end of the television monitor wall mount crossbeam 207 and to the second mounting plate 205 at a second end of the television monitor wall mount crossbeam 207. The television monitor wall mount crossbeam 207 includes a television monitor mounting bracket 215 configured to have the television monitor mounted thereon.

The television monitor mounting bracket 215 is attached to a front side 209 of the television monitor wall mount crossbeam 207 at a location between the first end and the second end of the television monitor wall mount crossbeam 207. The television monitor mounting bracket 215 may be attached to a front surface or side 209 of the television monitor wall mount crossbeam 207 at any suitable location between the first end and the second end of the television monitor wall mount crossbeam 207. In one embodiment, the television monitor wall mount crossbeam 207 has a horizontal slot 223 or rail formed in or on the front side 209 of the television monitor wall mount crossbeam 207 into which or on which a corresponding portion of the back of the television monitor mounting bracket 215 may be slidably inserted in a manner such that the television monitor mounting bracket 215 may be moved to other locations as along the front side 209 television monitor wall mount crossbeam 207. Thus, the location of the of the television monitor mounting bracket 215 on the crossbeam 207 (and thus the location of a television mounted on the bracket 215) may be may be adjusted accordingly as desired by an end user or technician. The television wall mount 201 is made of metal such as aluminum or steel, but may be made of any material that is strong enough to hold the weight of a television mounted thereon. However the various parts of the television wall mount 201 described herein need not be made of the same material.

Figure 2B:
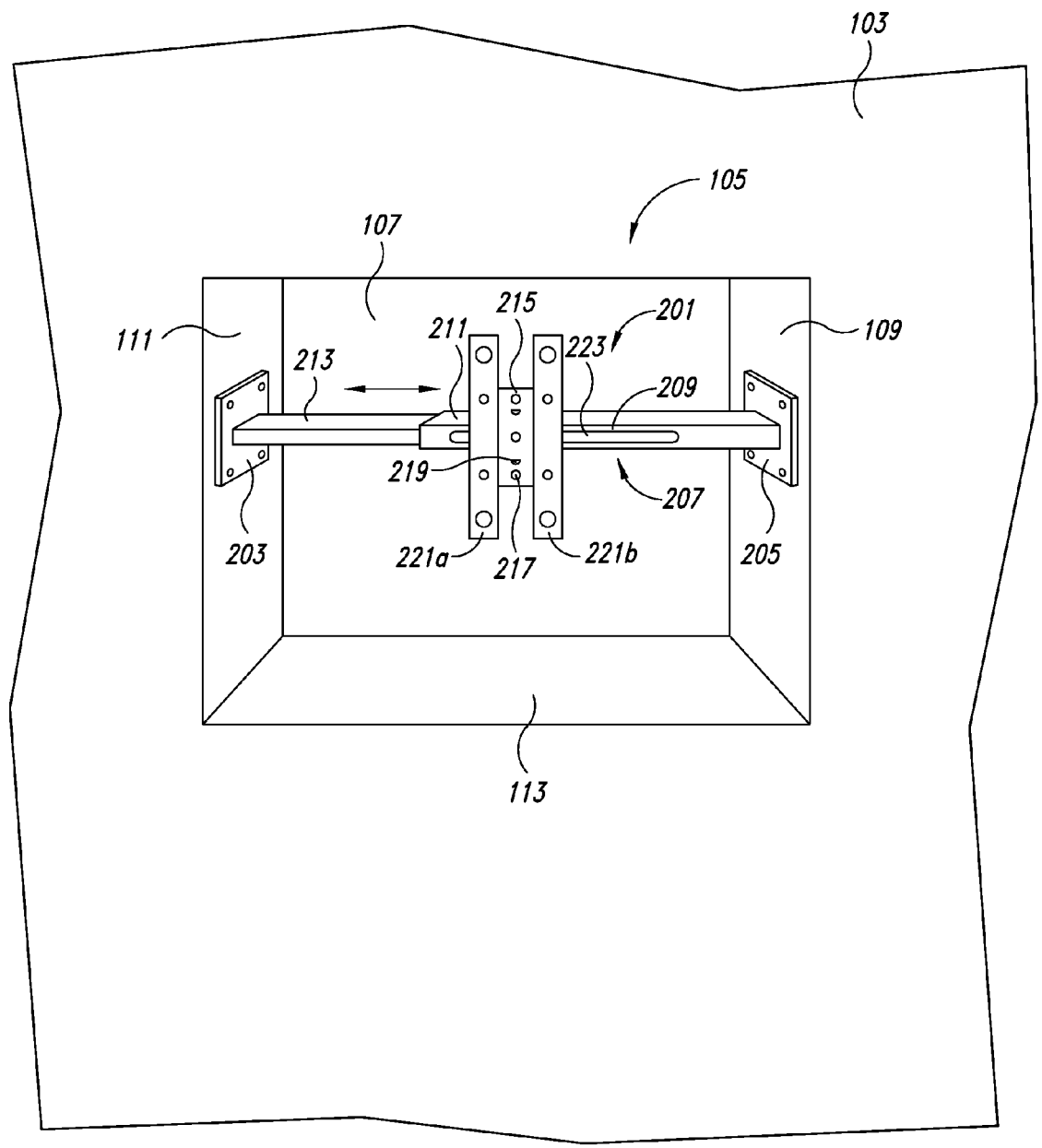
FIG. 2B is a front perspective view of a television wall mount installed in the example television wall nook of FIG. 1 shown with two television mounting bars hung thereon, according to one example embodiment.

FIG. 2B is a front perspective view of a television wall mount 201 installed in the example television wall nook of FIG. 1 shown with two television mounting bars 221a and 221b hung thereon, according to one example embodiment.

In some embodiments, one or more television mounting bars (e.g., television mounting bars 221a and 221b) are provided that may be removeably hung on or otherwise attached to the television monitor mounting bracket 215. The two television mounting bars 221a and 221b are configured to be attached to the back of the television (e.g., television 301 shown in FIG. 3) such that the television 301 may then be removeably hung on the television monitor mounting bracket 215 (e.g., see FIG. 3). The television mounting bars 221a and 221b may each have corresponding hooks on the back of, or formed as part of, the corresponding television mounting bars 221a and 221b that hang over the top of the television monitor mounting bracket 215 in a vertical position. In other embodiments television mounting bars 221a and 221b may have corresponding hooks on the back of the television mounting bars 221a and 221b that hang on or are inserted into corresponding holes in the television monitor mounting bracket 215. The television mounting bars 221a and 221b may be attached to the back of the television 301 by screws and bolts, but in other various embodiments other attachment mechanisms may be used such as hooks, fasteners, etc. In various embodiments, the television mounting bars 221a and 221b may also have mechanisms that are configured to allow the angle of the television attached thereto to be adjusted.

Figure 3:
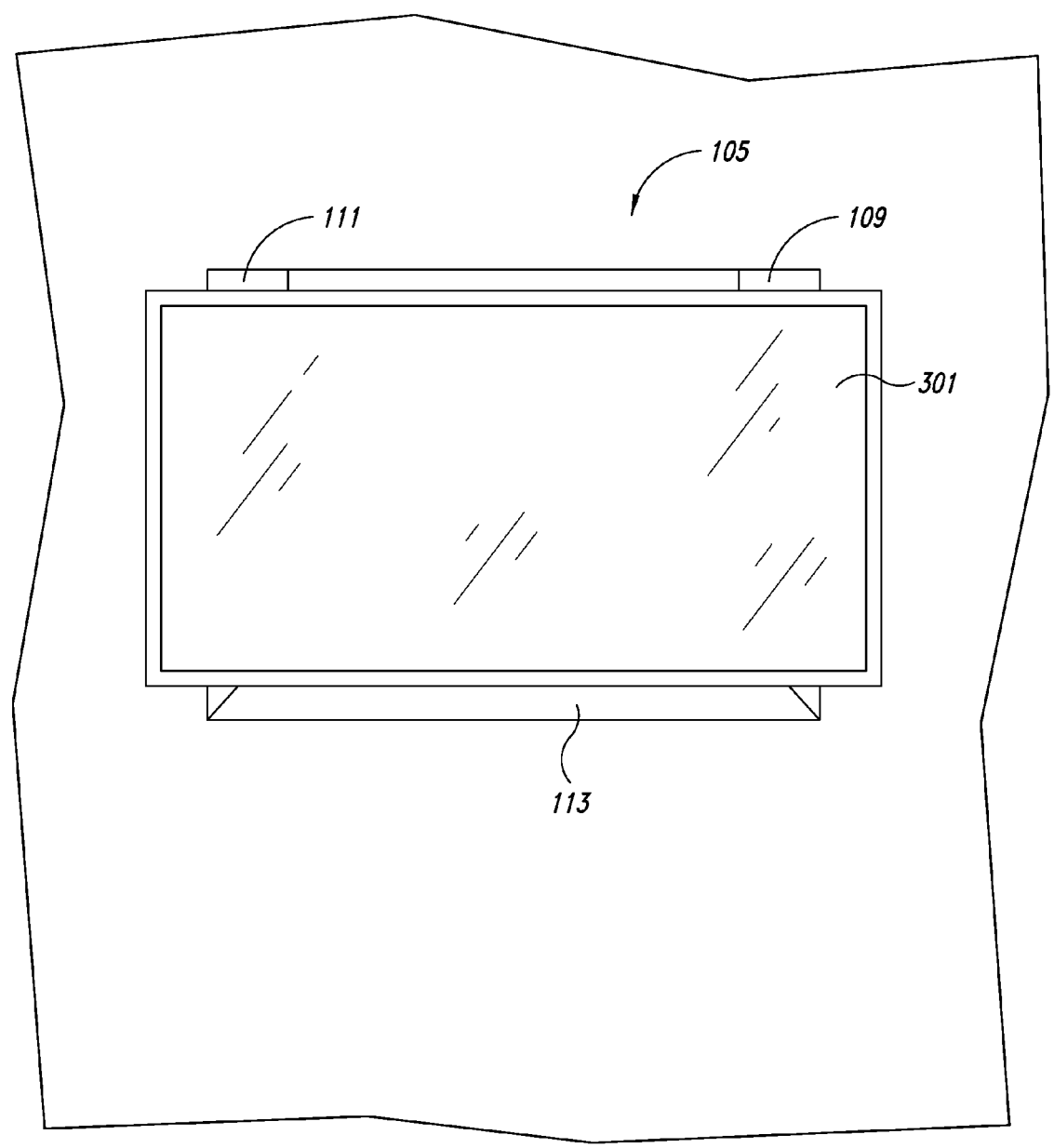
FIG. 3 is a front perspective view of a television mounted on the television wall mount of FIG. 2A, according to one example embodiment.

FIG. 3 is a front perspective view of a television monitor 301 mounted on the television wall mount 201 of FIG. 2A, according to one example embodiment. The television monitor 301 may be bolted, screwed or hung on the television monitor mounting bracket 215, which is attached to the television monitor wall mount crossbeam 207 (not shown). Alternatively, in some embodiments, the television monitor 301 may first be attached to one or more television mounting bars (e.g., television mounting bars 221a and 221b shown in FIG. 2B), which may be hung on or otherwise attached to the television monitor mounting bracket 215 as described above with respect to FIG. 2B.

The television wall mount 201 is installed at a position in the television wall nook 105 such that when the television monitor 301 is bolted, screwed or hung on the television monitor mounting bracket 215 (or attached to the television mounting bars 221a and 221b and then hung on the television monitor mounting bracket 215) the television 301 is located in front of and outside the television wall nook 105 as shown in FIG. 3. In this manner, as shown in FIG. 3, a television monitor 301 that is too wide to fit in the television wall nook 105 may be installed over the television wall nook 105 by mounting the television on the television wall mount 201 installed in the television wall nook 105.

Figure 4:
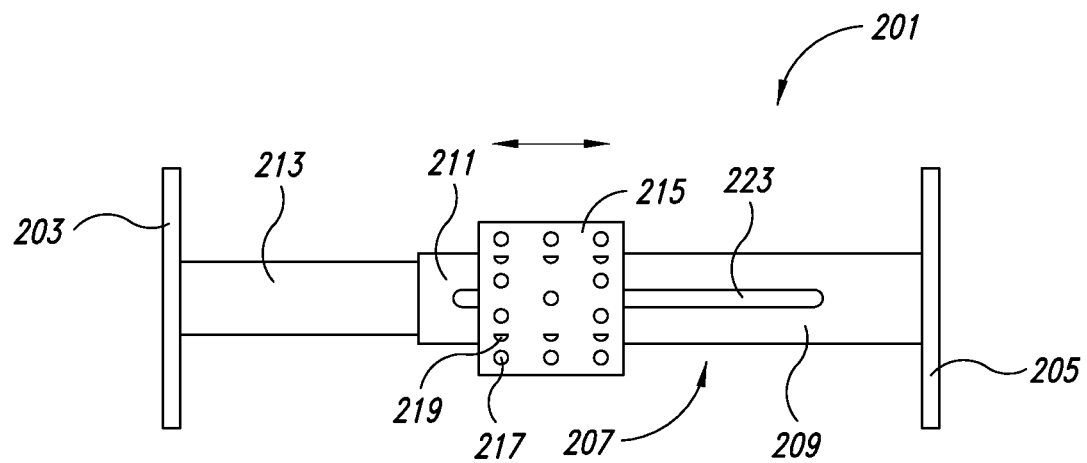
FIG. 4 is a front elevation view of the television wall mount of FIG. 2A, according to one example embodiment.

FIG. 4 is a front elevation view of the television wall mount 201 of FIG. 2A, according to one example embodiment. In the example embodiment of FIG. 4, the television monitor wall mount crossbeam 207 is adjustable by having a telescoping mechanism that includes a smaller crossbeam section 213 that is slidably inserted into a larger crossbeam section 211. This is in order for the television monitor wall mount crossbeam 207 to be able to lengthen and shorten to correspond to different dimensions of various television wall nooks in which the television monitor wall mount 201 is configured to be installed. The television monitor mounting bracket 215 that configured to have the television monitor mounted thereon includes holes 217 for bolting or screwing a television thereto and/or holes 219 into which hooks may be inserted in order to hang a television thereon. Another mounting bracket (not shown) may also be provided that is attachable to the back of the television monitor 301 and that has the applicable hooks or holes that correspond to those of the television monitor mounting bracket 215 such that the television may be screwed, bolted or hung on the television monitor mounting bracket 215.

Figure 5A:
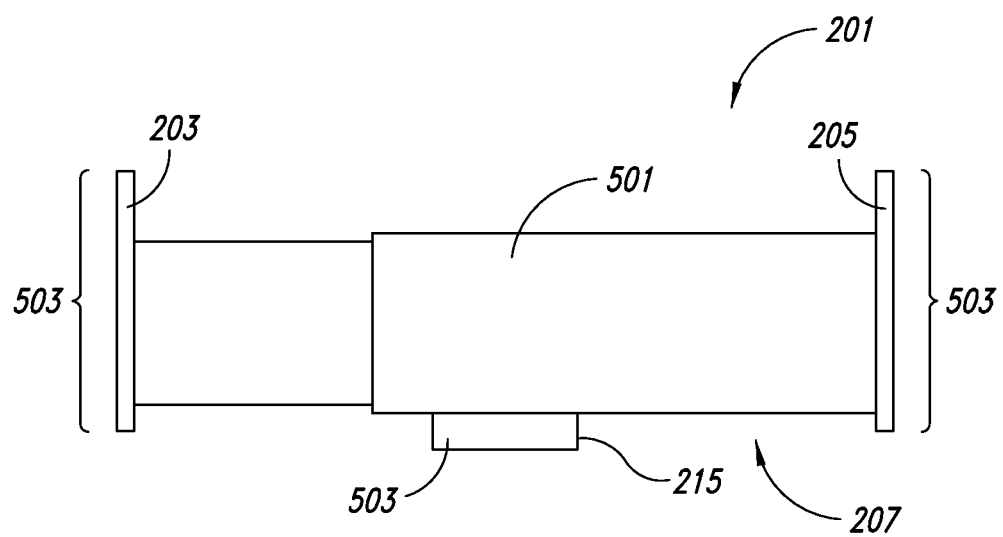
FIG. 5A is a top plan view of the television wall mount of FIG. 4, according to one example embodiment.

FIG. 5A is a top plan view of the television wall mount of FIG. 4, according to one example embodiment. Shown is a top surface 501 of the television monitor wall mount crossbeam 201 and a top surface 503 of the television monitor mounting bracket 215. As shown in FIG. 5, the length 503 of the first mounting plate 203 and second mounting plate 205 is such that the television monitor wall mount crossbeam 207 may be attached thereteo.

Figure 5B:
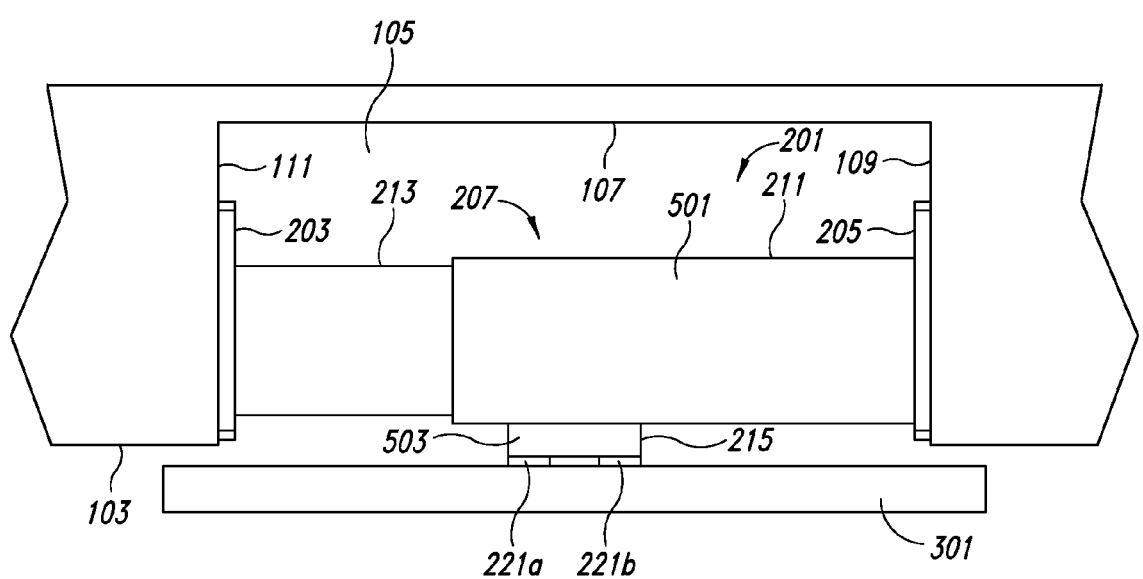
FIG. 5B is a top cross sectional view of the wall having the wall nook of FIG. 1 with the wall mount of FIG. 5A installed therein, according to one example embodiment.

FIG. 5B is a top cross sectional view of the wall 103 having the wall nook 105 of FIG. 1 with the wall mount of FIG. 5A installed therein, according to one example embodiment. The first mounting plate 203 and second mounting plate 205 on which the television monitor wall mount crossbeam 207 is attached is attached (e.g., by bolts, screws, fasteners and/or glue, etc.) to corresponding side walls 11 and 109 of the television wall nook 105. As shown in FIG. 5B, the position on the first mounting plate 203 and second mounting plate 205 on which the television monitor wall mount crossbeam 207 is attached, the depth of the top surface of the television monitor wall mount crossbeam 501 and the depth of the top surface 503 of the television monitor mounting bracket 215 (and the depth of any television mounting bars 221a and 221b between the back of the television 301 and the mounting bracket 215) is such that the television wall mount 201 may be installed at a position in the television wall nook 105 that allows the television 301 to be located outside the television wall nook 105 over the vertical surface of the wall 103 when mounted on the television wall mount 105. In various different alternative embodiments, the television wall mount 213 may include brackets such that it can be attached to other surfaces of the television wall nook 105 (e.g., the back wall 107, the back wall 107 and one or more side walls 111 and 109, a top surface of the television wall nook, etc.) at various alternative positions that allow the television 301 to be located outside the television wall nook 105 over the vertical surface of the wall 103 when mounted on the television wall mount 105.

Figure 5C:
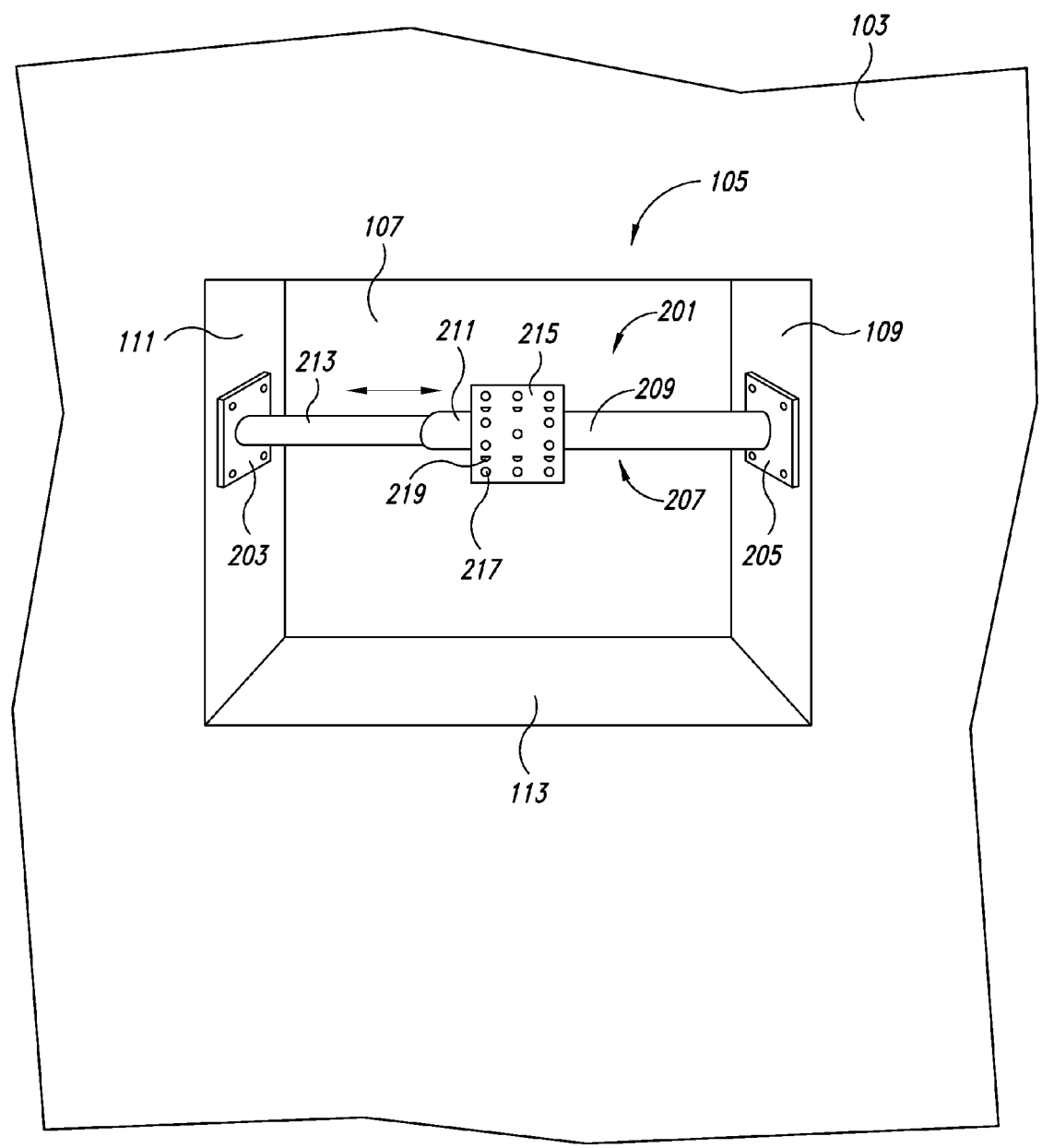
FIG. 5C is a front perspective view of a television wall mount installed in the example television wall nook of FIG. 1, showing the television monitor wall mount crossbeam as a cylindrical tube instead of a rectangular beam, according to one example embodiment.

FIG. 5C is a front perspective view of a television wall mount 201 installed in the example television wall nook of FIG. 1, but showing the television monitor wall mount crossbeam 207 as a telescoping cylindrical tube instead of a telescoping rectangular beam, according to one example embodiment. In other various embodiments, the television monitor wall mount crossbeam 207 may be of other shapes than a rectangular beam or a cylindrical tube, such as an elliptical tube or polygonal tube, or in other embodiments may be a flat sheet of material. The television monitor mounting bracket 215 may be attached to the to a front side 209 of the television monitor wall mount crossbeam 207 at any suitable location between the first end and the second end of the television monitor wall mount crossbeam 207. In one embodiment, the television monitor wall mount crossbeam 207 has a horizontal slot 223 or rail formed in or on the front side 209 of the television monitor wall mount crossbeam 207 (such as that shown in FIG. 2A) into which or on which a corresponding portion of the back of the television monitor mounting bracket 215 may be slidably inserted in a manner such that the television monitor mounting bracket 215 may be moved to other locations along a front surface 209 of the television monitor wall mount crossbeam 207. Thus, the location of the of the television monitor mounting bracket 215 on the crossbeam 207 (and thus the location of a television mounted thereon) may be may be adjusted accordingly as desired by an end user or technician.

Figure 6:
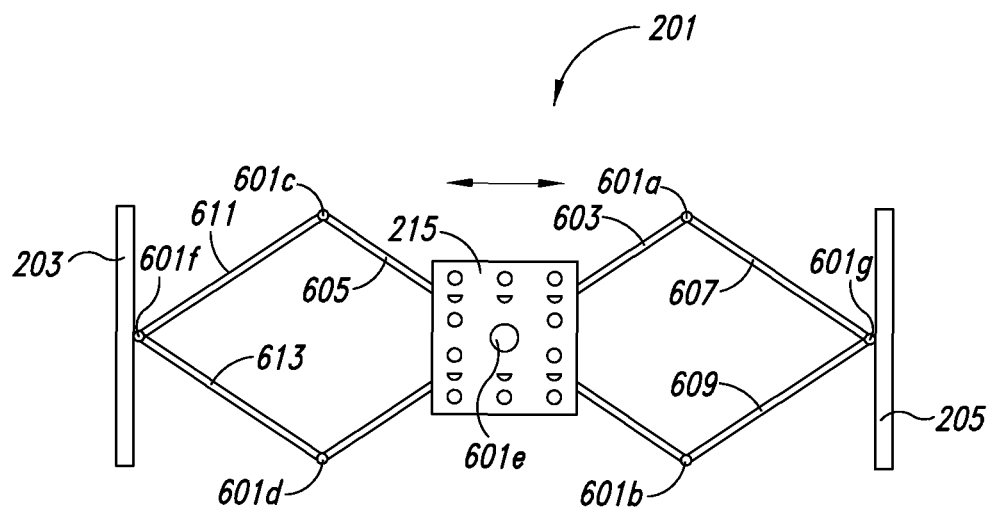
FIG. 6 is a front elevation view of a television wall mount, according to an example alternative embodiment.

Also, the television monitor wall mount crossbeam may be adjustable in any manner in various alternative embodiments to accommodate television wall nooks of different dimensions. For example, shown in FIG. 6 is a front elevation view of a television wall mount, according to an example alternative embodiment. As shown in FIG. 6, the length of the television wall mount 201 is expandable and collapsible via use of a scissor mechanism disposed between the first mounting plate 203 and second mounting plate 205 including arms 603, 605, 607, 609, 611 and 613, and corresponding scissor hinges or joints 601a, 601b, 601c, 601d and 601e. Thus, the television wall mount 201 is expandable and collapsible to fit and be installed in television wall nooks of various different widths.

Figure 7:
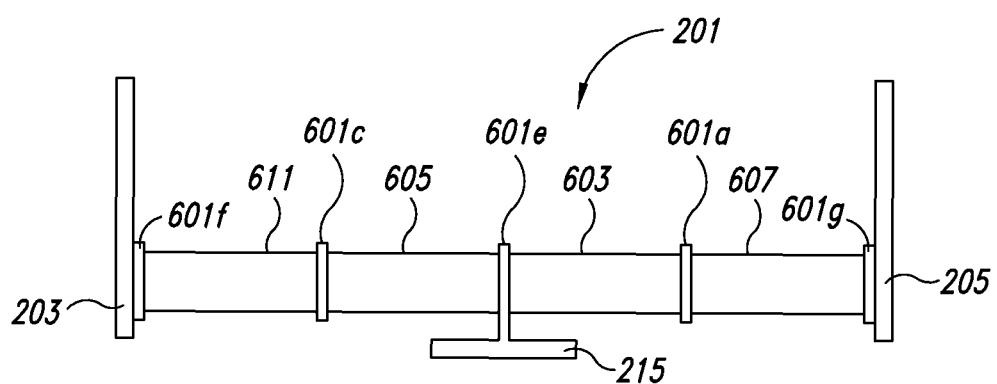
FIG. 7 is a top plan view of the television wall mount of FIG. 6, according to an example embodiment.
Figure 8:
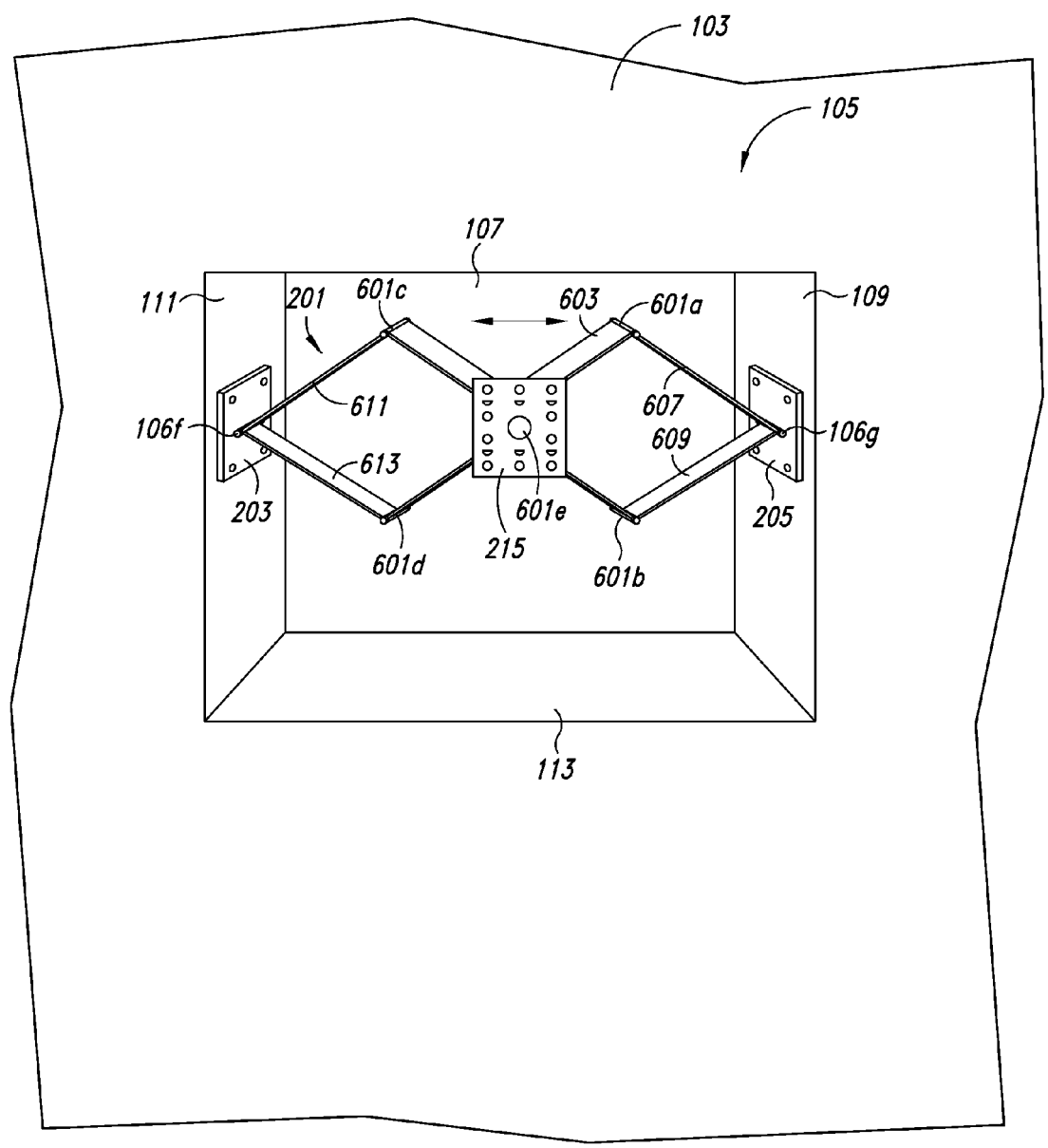
FIG. 8 is a front perspective view of the television wall mount of FIG. 7 installed in the example television wall nook of FIG. 1, according to one example embodiment.
Figure 9:
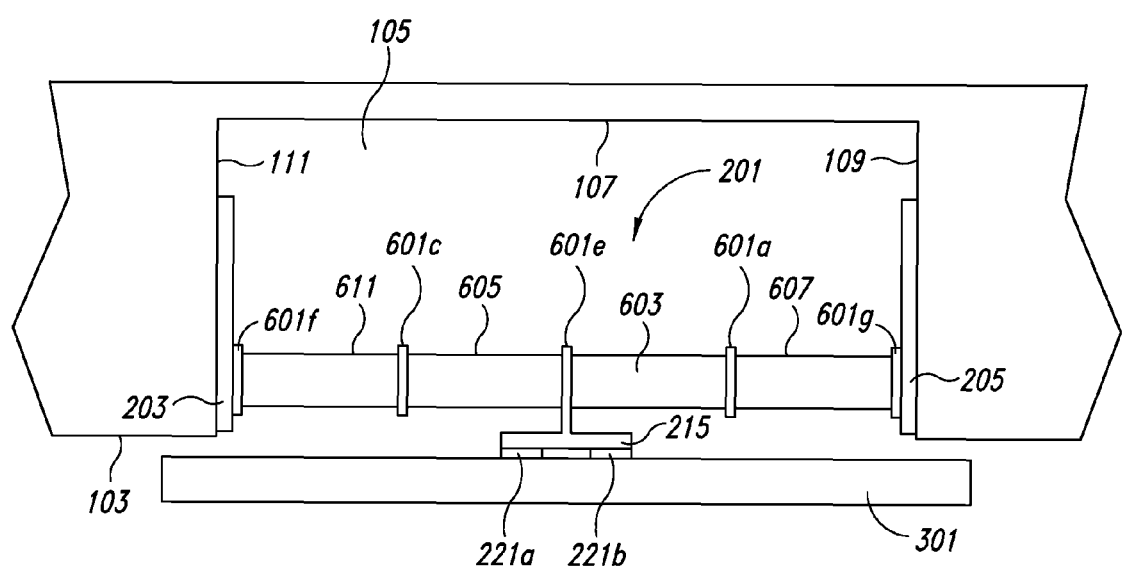
FIG. 9 is a top cross sectional view of the wall having the wall nook of FIG. 1 with the wall mount of FIG. 8 installed therein, according to one example embodiment.

In particular, FIG. 7 is a top plan view of the television wall mount of FIG. 6, according to the example embodiment including the scissor mechanism; FIG. 8 is a front perspective view of the television wall mount of FIG. 7 installed in the example television wall nook of FIG. 1 according to the example embodiment including the scissor mechanism; and FIG. 9 is a top cross sectional view of the wall having the wall nook of FIG. 1 with the wall mount of FIG. 8 installed therein according to the embodiment including the scissor mechanism described above.

While various embodiments have been described hereinabove, it is to be appreciated that various changes in form and detail may be made without departing from the spirit and scope of the invention(s) presently or hereafter claimed.

The invention claimed is:

1. A television monitor wall mount comprising:
   a first mounting plate configured to be attached to a first planar surface of a television wall nook;
   a second mounting plate configured to be attached to a second planar surface of the television wall nook;
   at least one television monitor wall mount crossbeam configured to have the television monitor attached thereto, the television monitor wall mount crossbeam attached to the first mounting plate with a pivotal joint at a first end of the television monitor wall mount crossbeam and attached to the second mounting plate with a pivotal joint at a second end of the television monitor wall mount crossbeam; and
   at least one joint in the television monitor wall mount crossbeam that enables at least one arm of the television monitor wall mount crossbeam to pivot at the at least one joint in order for a distance between the first end and the second end of the television monitor wall mount crossbeam to lengthen and shorten to correspond to different dimensions of television wall nooks.

2. The television monitor wall mount of claim 1 wherein the first planar surface of the television wall nook is a first side wall of the television wall nook and the second planar surface of the television wall nook is a second side wall of the television wall nook.

3. The television monitor wall mount of claim 1 wherein the first planar surface of the television wall nook is a top surface of the television wall nook and the second planar surface of the television wall nook is a bottom surface of the television wall nook.

4. The television monitor wall mount of claim 1 wherein the first planar surface of the television wall nook is a back wall of the television wall nook and the second planar surface of the television wall nook is a different planar surface of the television wall nook than the back wall of the television wall nook.

5. The television monitor wall mount of claim 1 wherein the television monitor wall mount crossbeam includes a television monitor mounting bracket configured to have the television monitor mounted thereon, the television monitor mounting bracket attached to a side of the television monitor wall mount crossbeam at a location between the first end and the second end of the television monitor wall mount crossbeam.

6. The television monitor wall mount of claim 5 wherein the television monitor wall mount crossbeam is attached to the first mounting plate at a location on the first mounting plate and is attached to the second mounting plate at a location on the second mounting plate such that the television monitor wall mount can be installed at a position in the television wall nook wherein the television monitor mounting bracket that is configured to have the television monitor mounted thereon extends outside the television wall nook.

7. The television monitor wall mount of claim 1 wherein the first planar surface of the television wall nook faces the second planar surface of the television wall nook.

8. A television monitor wall mount kit including:
   a first mounting plate configured to be attached to a first planar surface of a television wall nook;
   a second mounting plate configured to be attached to a second planar surface of the television wall nook;
   at least one television monitor wall mount crossbeam configured to have a television monitor attached thereto, the television monitor wall mount crossbeam attachable to the first mounting plate with a pivotal joint at a first end of the television monitor wall mount crossbeam and attachable to the second mounting plate with a pivotal joint at a second end of the television monitor wall mount crossbeam; and
   at least one joint in the television monitor wall mount crossbeam that enables at least one arm of the television monitor wall mount crossbeam to pivot at the at least one joint in order for a distance between the first end and the second end of the television monitor wall mount crossbeam to lengthen and shorten to correspond to different dimensions of television wall nooks.

9. The television monitor wall mount kit of claim 8 wherein the first planar surface of the television wall nook is a first side wall of the television wall nook and the second planar surface of the television wall nook is a second side wall of the television wall nook.

10. The television monitor wall mount kit of claim 8 further including a television monitor mounting bracket configured to have the television monitor mounted thereon, the television monitor mounting bracket attachable to a side of the television monitor wall mount crossbeam at a location between the first end and the second end of the television monitor wall mount crossbeam.

11. The television monitor wall mount kit of claim 10 wherein the television monitor wall mount crossbeam is attachable to the first mounting plate at a location on the first mounting plate and is attachable to the second mounting plate at a location on the second mounting plate such that the television monitor wall mount can be installed at a position in the television wall nook wherein the television monitor mounting bracket that is configured to have the television monitor mounted thereon extends outside the television wall nook.

12. The television monitor wall mount kit of claim 10 further comprising at least one television mounting bar attachable to the back of the television monitor and hangable on the television monitor mounting bracket.

13. The television monitor wall mount kit of claim 12 wherein the television monitor mounting bracket is movably attachable along the side of the television monitor wall mount crossbeam to allow the television monitor mounting bracket to be attached at different selectable locations horizontally along the side of the television monitor wall mount crossbeam between the first end and the second end of the television monitor wall mount crossbeam.

14. The television monitor wall mount kit of claim 8 wherein the at least one joint in the television monitor wall mount crossbeam is a scissor joint.

15. The television monitor wall mount kit of claim 8 wherein the television wall nook is for a television having a television screen aspect ratio of approximately 4:3 and the television monitor has a width that is larger than a width of the television wall nook and a height that is smaller than a height of the television wall nook.

\* \* \* \* \*